XR 3,621,309

[redacted]

[11] 3,621,309

[72] Inventors Takeo Yokoyama; Kitamura Atsugi, both of Hiroshi, Kanagawa, Japan

[21] Appl. No. 27,738
[22] Filed Apr. 13, 1970
[45] Patented Nov. 16, 1971
[73] Assignee Mitsumi Electric Company Ltd. Tokyo, Japan
[32] Priority Apr. 19, 1969
[33] Japan
[31] 44/30070

[54] ELECTRIC-MECHANICAL TRANSDUCER
2 Claims, 3 Drawing Figs.

[52] U.S. Cl. .......... 310/8.7, 310/9.7, 333/72
[51] Int. Cl. .......... H01v 7/00
[50] Field of Search .......... 310/8.1, 8.3, 8.7, 9.7, 9.8; 333/30, 72

[56] References Cited

UNITED STATES PATENTS

| | | | |
|---|---|---|---|
| 3,401,360 | 9/1968 | Schulz-DuBois | 333/30 |
| 3,300,739 | 1/1967 | Mortley | 333/30 |
| 3,293,574 | 12/1966 | Baum | 333/30 |
| 3,406,350 | 10/1968 | Mewell | 310/9.7 X |
| 3,400,341 | 9/1968 | Sittig | 333/30 |

*Primary Examiner*—D. F. Duggan
*Assistant Examiner*—B. A. Reynolds
*Attorney*—Marshall & Yeasting

ABSTRACT: An electric-mechanical transducer having corrugated or comblike characteristics comprising an electric-mechanical transducer element constituted by a piezoelectric resonator plate having a first and a second electrode provided on one surface thereof and a common electrode provided on the other surface thereof, and reflection-type supersonic transmission medium, wherein the common electrode of the piezoelectric resonator plate is attached to one end surface of the reflection-type supersonic transmission medium, input terminals are let out of the first and common electrodes of the piezoelectric resonator plate respectively, and output terminals are led out of the second and common terminals thereof.

ELECTRIC-MECHANICAL TRANSDUCER

BACKGROUND OF THE INVENTION

Field of the Invention

This invention relates to an electric-mechanical transducer, and more particularly it pertains to an electric-mechanical transducer having corrugation or comb type filter characteristics which comprises a combination of an electric-mechanical transducer element and reflection-type supersonic transmission medium.

The comb-type filter referred to above is a filter of which the response curve takes the form of corrugation or comb when the frequency is indicated on the horizontal axis and the response on the vertical axis. Such a filter may be constituted by the use of an electric-mechanical transducer element formed by a piezoelectric resonator plate having an electrode provided on each surface thereof and a reflection-type supersonic transmission line, with one end surface of the piezoelectric resonator plate being attached to one end surface of the transmission line. With such a filter, however, it is essential to provide special circuits in the electrical signal input circuit and combined-signal output circuit respectively for the purpose of isolating these input and output circuits because the input and output terminals are led out of the electrodes provided on the opposite surfaces of the piezoelectric resonator plate respectively. Disadvantageously, this leads to complicated construction and increased cost.

Alternatively, a comb-type filter may also be constituted by the use of two electric-mechanical transducer elements each constituted by a piezoelectric resonator plate having an electrode provided on each surface thereof, and a reflection type supersonic transmission line, wherein one surface of each resonator plate is attached to one end surface of the transmission line, the electric-mechanical transducer elements are adapted to constitute the input and output circuits respectively, and the input side electric-mechanical transducer is electrical signalwise connected with the output side one. However, such a filter is disadvantageous in that it is essential that the transmission line be so constructed that a reflected supersonic wave appearing at the input side electric-mechanical transducer element is permitted to arrive at the output side one and also in that it is necessary to provide a special circuit for electrical signalwise coupling the input and output sides to each other. Another disadvantage is such that the transmission line should have a sufficient end area that the two electric-mechanical transducer elements can be attached thereto; this requires the use of a bulky transmission line.

SUMMARY OF THE INVENTION

It is an object of the present invention to provide a simplified and miniaturized electric-mechanical transducer having corrugation or comb-type filter characteristics and which is free from the aforementioned various disadvantages.

Other objects, features and advantages of the present invention will become apparent from the following description taken in conjunction with the accompanying drawings.

DESCRIPTION OF THE PREFERRED EMBODIMENTS

Figure 1:
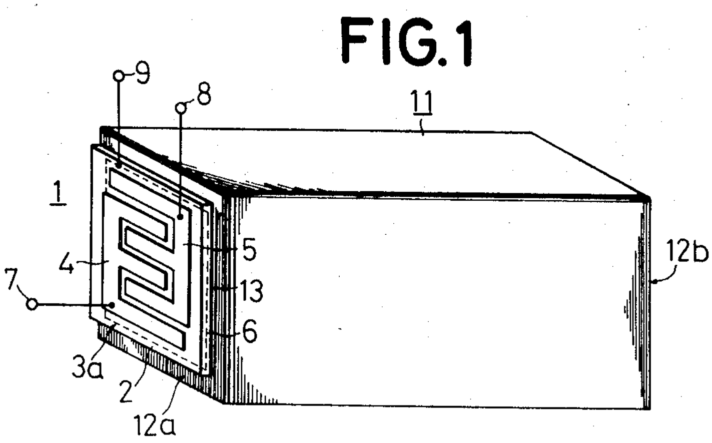
FIG. 1 is a schematic enlarged perspective view showing the electric-mechanical transducer according to an embodiment of the present invention.
Figure 2:
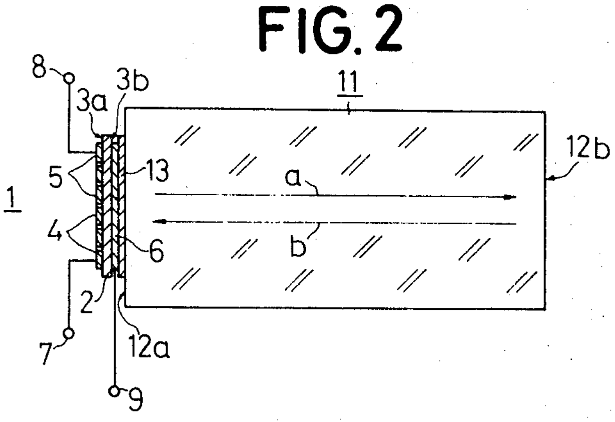
FIG. 2 is a longitudinal sectional view thereof.
Figure 3:
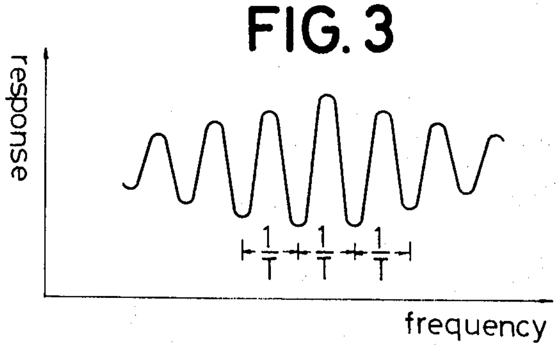
FIG. 3 is a view showing a frequency response curve useful for explaining the present invention.

Referring to FIGS. 1 and 2 of the drawings, the electric-mechanical transducer is generally shown at 1, which comprises a thicknesswise torsional vibration-type piezoelectric resonator plate 2 formed by a ceramic material for example, first and second electrodes 4 and 5 provided on one surface 3*a* of the piezoelectric resonator plate 2, and a common electrode 6 provided on the other surface of the resonator plate 2 in opposing relationship to the first and second electrodes 4 and 5, wherein input and output terminals 7 and 8 are led out of the first and second electrodes 4 and 5 respectively, and a common electrode 9 is led out of the common electrode 6.

As shown in the drawings, the first and second electrodes 4 and 5 are configured in the form of a comb and disposed in staggered relationship to each other. Thus, if an input electrical signal is applied between the first electrode 4 and the common electrode 6, then an output electrical signal which is substantially nondelayed relative to the input signal will be available between the second electrode 5 and the common electrode 6.

Numeral 11 indicates a supersonic transmission medium or line which may be formed by a glass plate and configured in the form of a square pillar. The supersonic transmission line 11, which is provided with opposing parallel end surfaces 12*a* and 12*b*, is constructed in the reflection type by mirror-finishing the end surface 12*a*.

The electric-mechanical transducer element 1 has the common electrode 6 side surface thereof attached to the end surface of the reflection-type supersonic transmission line 11 by means of an adhesive agent 13 so as to be coupled thereto mechanical vibrationwise.

With the foregoing arrangement, an input electrical signal, which is supplied between the input terminal 7 and the common terminal 9, is in turn passed to be imparted between the electrodes 4 and 6 of the electric-mechanical transducer 1 so that the resonator plate 2 is vibrated. As a result, an output electrical signal which is substantially nondelayed relative to the input signal is thereupon obtained between the electrodes 5 and 6. At the same time, supersonic wave is produced from the vibrations of the resonator plate 2, and it is made to propagate from the end surface 12*a* toward the other end surface 12*b* of the transmission line 11 as indicated by an arrow *a* in FIG. 2 and then reflected at the end surface 12*b* so as to be returned to the end surface 12*a* as indicated by an arrow *b*. The supersonic wave thus reflected is imparted to the resonator plate 2 of the electric-mechanical transducer 1. Assuming that the time required for the two-way propagation of the supersonic wave through the transmission line 11 is T, an output electrical signal which is delayed substantially by T relative to the input signal is obtained between the electrodes 5 and 6. Thus, there is after all obtained between the electrodes 5 and 6 a composite output electrical signal which is a combination of an output electrical signal which is substantially nondelayed relative to the input electrical signal and the output electrical signal which is delayed substantially by T relative to the input electrical signal.

On the assumption that the input electrical signal is an AC frequency signal, there is instantly obtained a so-called comb-type filter representing response characteristics which are cyclically varied with frequency at a cyclic period of about 1/T.

If the input electrical signal is an impulse, and the width of the impulse is shorter than the time T, then there will instantly be obtained a pulse train consisting of an output pulse occurring at the point of time when the input pulse was provided and another output pulse delayed by T relative to the input pulse.

As described above, by combining the single electric-mechanical transducer element 1 comprising the single resonator plate and the first and second electrodes provided on one surface of the resonator plate and common electrode provided on the other surface thereof with the reflection-type supersonic transmission line 11, there is obtained a simplified and miniaturized electric-mechanical transducer which is so designed that application of an input electrical signal to the electric-mechanical transducer element 1 results in a composite output electrical signal which is a combination of an output electrical signal substantially nondelayed relative to the input electrical signal and another output electrical signal delayed relative to the input electrical signal by the period of time required for two-way propagation of a supersonic wave generated on the basis of the input electric signal by the electric-mechanical transducer element through the reflection type supersonic transmission line 11.

The aforementioned composite output electrical signal can be obtained by an arrangement including a single electric-mechanical transducer element constituted by a resonator plate having an electrode provided on each surface thereof and a single reflection-type supersonic transmission line with one surface of the single electric-mechanical transducer element being attached to one end surface of the transmission line. However, this arrangement is constructed in the form of a two-terminal circuit, which requires special circuits to be provided in the circuit to which an input electrical signal is supplied and the circuit from which the composite output electrical signal is obtained, respectively, for the purpose of isolating these input and output circuits from each other. Disadvantageously this leads to the complicated construction and increased cost. It is also possible to obtain an electrical signal similar to the aforementioned composite out electrical signal with the aid of an arrangement including two electric-mechanical transducer elements each constituted by a resonator plate having an electrode provided on each surface thereof and a single reflection-type supersonic transmission line, wherein the two electric-mechanical transducer elements are attached at one surface to one end surface of the transmission line with these electrical-mechanical elements serving as the input and output elements respectively and the input side electric-mechanical transducer electric coupled to the output side one electrical signal wise. With such an arrangement, however, it is essential that the transmission line be constructed so that reflection of a supersonic wave available from the input side electric-mechanical transducer element may be passed to the output side electric-mechanical transducer, and it is also necessary to provide a special circuit for coupling the input and output sides to each other electrical signalwise. Furthermore, the transmission line should have a sufficient end area to attach the two electric-mechanical transducer elements thereto; this makes the transmission line bulky.

In contrast, the present invention is embodied in an electric-mechanical transducer which is free from the foregoing disadvantages.

As described above, in accordance with the present invention, there is obtained a composite output electrical signal consisting of an output electrical signal substantially nondelayed relative to an input electrical signal and another output electrical signal delayed by the period of time which is required for two-way propagation of a supersonic wave through the delay transmission line, but strictly speaking, the former output electrical signal is slightly delayed with respect to the input electrical signal. However, such a slight delay is minimized by the fact that the first and second electrodes 4 and 5 are configured in the form of a comb and disposed in staggered relationship to each other as shown in the drawings. Thus, it is possible to obtain a comb-type filter with an accurate desired cyclic period depending upon the length of the transmission line substantially by considering the transmission line length alone. In the case where two rectangular electrodes are juxtaposed on a single resonator plate for example (needless to say, this also belongs to the spirit of the present invention), the amount of the aforementioned slight delay in a strict sense of the former output electric signal relative to the input electrical signal turns out to be greater than in the case of the electrodes having such configuration and disposing as shown in the drawings, so that strictly speaking, it is impossible to obtain the accurate desired comb-type filter. In this sense, therefore, the illustrated electrode configuration and disposition are very suitable as an embodiment of the present invention.

In the foregoing, description has been made of the case where the electric-mechanical transducer includes the single electrode 6 common to the first and second electrodes 4 and 5 which is provided on one surface **3*b* of the resonator plate 2. However, it is also possible that the single common electrode 6 may be replaced with third and fourth electrodes which are associated with the first and second electrodes 4 and 5 respectively so that an input electrical signal may be supplied between the third electrode and the first electrode 4 and a composite output electrical signal may be taken from between the fourth electrode and the second electrode 5. In such a case, by providing the third and fourth electrodes with similar configuration and disposition to those of the first and second electrodes 4 and 5 respectively it is also possible to obtain similar effect to that described above in the strict sense considering the configuration and disposition of the first and second electrodes 4 and 5**.

Although the particular embodiment of the present invention has been described, it will be readily apparent that various changes and modifications will become possible without departing the spirit and scope of the present invention.

We claim:

1. An electromechanical filter comprising an electromechanical transducer element formed with a piezoelectric resonator plate having a first and a second electrode on one surface thereof and an electrode common to said first and second electrodes on the other surface thereof, a reflection-type supersonic transmission medium having first and second end faces in parallel opposition to each other, said electromechanical transducer element being coupled to said first end face of the reflection-type supersonic transmission medium, in which an input electric signal is imparted between said first and common electrodes to obtain a composite output electric signal between said second and common electrodes, said composite output electric signal consisting of first and second output electric signals, said first output electric signal being produced from the vibration of said piezoelectric resonator plate caused by said input electric signal but substantially nondelayed relative to the input electric signal, and said second output electric signal being produced from the vibration of said piezoelectric resonator plate caused by a supersonic wave and delayed substantially by T relative to said input electric signal, said supersonic wave corresponding to a supersonic wave which is produced from the vibration of said piezoelectric resonator plate caused by said input electric signal, directed toward the second end face of said supersonic transmission medium from the first end face thereof and reflected by the second end face back to said piezoelectric resonator plate through the first end face of said supersonic transmission medium, said T corresponding to the time for the two-way propagation of said supersonic wave in said supersonic transmission medium between the first and second end faces thereof; whereby the frequency response characteristics of said output electric signal is in the form of a comb and cyclically vary at a frequency of 1/T.

2. An electromechanical filter as claimed in claim 1 wherein said first and second electrodes are configured in the form of a comb and disposed in staggered relationship to each other.

* * * * *